United States Patent
Jahanghir et al.

(10) Patent No.: US 6,665,343 B1
(45) Date of Patent: Dec. 16, 2003

(54) METHODS AND ARRANGEMENTS FOR A CONVERTING A HIGH DEFINITION IMAGE TO A LOWER DEFINITION IMAGE USING WAVELET TRANSFORMS

(75) Inventors: Musa Jahanghir, Hayward, CA (US); Jack Chaney, Gilroy, CA (US); Michael A. Kaufman, San Jose, CA (US)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/151,428

(22) Filed: Sep. 11, 1998

Related U.S. Application Data (60) Provisional application No. 60/058,697, filed on Sep. 12, 1997.

(51) Int. Cl.[7] .................................................. H04N 7/30
(52) U.S. Cl. .............................. 375/240.19; 382/248
(58) Field of Search ............... 348/426.1; 375/240.19, 375/240.18, 240.26; 382/232, 248; H04N 7/30

(56) References Cited

U.S. PATENT DOCUMENTS

| | | | | |
|---|---|---|---|---|
| 5,262,854 A | * | 11/1993 | Ng ........................ | 375/240.24 |
| 5,614,952 A | * | 3/1997 | Boyce et al. ............. | 375/240.2 |
| 5,825,936 A | * | 10/1998 | Clarke et al. ............ | 382/261 |
| 6,201,897 B1 | * | 3/2001 | Nixon ...................... | 382/248 |
| 6,272,180 B1 | * | 8/2001 | Lei ......................... | 375/240.18 |

OTHER PUBLICATIONS

*Revised Text for ITU–T Recommendation H.262 / ISO/IEC 13818–2:1995, Information technology—Generic coding of moving pictures and associated audio information: Video*; Publication Date Mar. 31, 1995; Re: Coding of Audio, Picture, Multimedia and Hypermedia Information; Secretariat: Japan (JISC).
*Wavelets and Filter Banks*, by Gilbert Strang & Truong Nguyen, Wellesley–Cambridge Press, Wellesley, MA, © 1996 by Gilbert Strang and Truong Nguyen.
*Digital Video: An Introduction to MPEG–2*, by Barry G. Haskell, Atul Puri, and Arun N.. Netravali, International Thomson Publishing, © 1997 by Chapman & Hall.

* cited by examiner

*Primary Examiner*—Howard Britton
(74) *Attorney, Agent, or Firm*—Kenneth L. Sherman; Sherman & Sherman; Jeffrey P. Aiello (57) ABSTRACT

Systems are provided for converting high definition pictures or data to lower definition images using wavelet transforms. In the preferred embodiments, the wavelet transforms are be used in either the transmission/coding or reception/decoding phase for enabling a more efficient conversion of the signal and providing a more robust and accurate output. The wavelet transforms may be applied to conventional systems to enhance performance or entire transmission and reception systems may be designed where the wavelet transforms are applied to the data for coding, decoding and decimation operations.

12 Claims, 5 Drawing Sheets

METHODS AND ARRANGEMENTS FOR A CONVERTING A HIGH DEFINITION IMAGE TO A LOWER DEFINITION IMAGE USING WAVELET TRANSFORMS

1. RELATED APPLICATION

This application claims the benefit of U.S. Provisional Application No. 60/058,697, filed Sep. 12, 1997.

2. FIELD OF THE INVENTION

The present invention relates to multimedia images and digital communications, and more particularly to methods and arrangements for converting a high definition picture or image to a lower definition image using wavelet transforms.

3. DESCRIPTION OF THE RELATED ART

Many different image and/or video sampling techniques are used in the coding, transmission and reproduction of multimedia images and/or signals such as, for example, still and moving pictures, video, and other related data signals such as audio. These techniques allow multimedia information to be properly coded, transmitted and reproduced by known hardware currently in use. Examples of such techniques are well known in the art and many are presented in the *Revised Text for ITU-T Recommendation H.262 ISO/IEC 13818-2:1995, Information technology—Generic coding of moving pictures and associated audio information: Video* dated Mar. 31, 1995.

On Nov. 4, 1994, the ISO (International Organization for Standards) Motion Picture Experts Group (MPEG) adopted a standard for audio/video digital compression known as MPEG-2. This standard allows for consistent digital signal sampling, coding, transmission and reception throughout the world and is well known in the art.

U.S. Pat. No. 5,262,854 issued to Ng on Nov. 16, 1993, entitled Lower Resolution HDTV Receivers, shows a receiver which decimates compressed HDTV digital video signal data to provide lower resolution NTSC images. This system allows high definition signals to be used on lower definition receivers which are currently more commonly in use than high definition receivers.

Similarly, there are many different types of video sampling techniques and digital component video formats commonly used in MPEG video coding. By way of example, there is a high definition 4:4:4 video format which defines the relative relationship between the luminance and chrominance components in a transmitted digital video color signal. In lower definition video sampling formats such as 4:2:2 and 4:2:0 there are less chrominance components per samples of luminance in the digital signal. All three of these sampling techniques are well known in the art. The higher definition sampling techniques and contain more information and therefore produce higher resolution images.

Regardless of the sampling technique, an appropriate display apparatus, such as a monitor or flat panel display, is required to effectively reproduce the encoded image. Given the current development of higher resolution systems and apparatii, a display that is capable of reproducing and displaying a higher resolution image can be very expensive. For example, a high definition television (HDTV) apparatus can cost several thousands of dollars. For many consumers, the cost of a HDTV can be prohibitive when compared to that of a standard definition television, such as, for example, a NTSC compatible apparatus which often costs less than a few hundred dollars.

There are similar cost issues for the producers and broadcasters of the video signals. Producing higher resolution images requires state of the art image recording and generating systems, and often requires that additional bandwidth be provided within the transmission channels in order to handle the increase in information (data) being provided to the consumers.

Broadcasters and consumers are also presented with the concern that there may be a period of time in which only a few consumers have higher resolution display apparatii. This is especially a concern as the technology moves to the next generation of imagery which will incorporate HDTV as the standard.

Thus, there is a need for methods and arrangements that allow the remaining consumers, which possess lower definition television and imaging equipment, to receive the higher definition image data and convert this data to lower definition image data that can be displayed on the lower resolution displays.

HDTV digital video signal decoders are also well known in the art. In conventional MPEG-compatible decoders, there is typically an inverse discrete cosine transform (IDCT) process that is used to decode video-related data that was previously encoded using a discrete cosine transform (DCT) process.

The image data that is encoded/decoded by conventional encoders and decoders typically includes three (3) components per pixel. The components are luminance data ($Y_c$), chrominance data ($U_c$) and chrominance data ($V_c$). For example, to display a high definition image, such as, for example, a 1920 by 1080 pixel image, a typical decoder would output 1920 by 1080 pixels of luminance-related data, and 960 by 540 pixels of chrominance-related data. In this example, the resulting data provides a 4:2:0 image having 1920 by 1080 pixels.

The known methods and arrangements for decimating or otherwise reducing the amount of image data attempt to create a subset of the image data that can then be displayed on a lower resolution display. To accomplish this "downscaling", the known methods and arrangements typically pre-parse or filter the received encoded image data. For example, these methods use masking techniques that eliminate particular data. The remaining portions of the encoded image data are then decoded, for example using a decoder having an IDCT process. The decoded image data is then filtered and/or decimated to further reduce the image for display on a lower resolution display.

By way of example, the amount of information used for a low definition image in certain decoders is ¼ the amount of information used for the original higher definition image. Thus, for a 1920 by 1080 pixel high definition image, the lower resolution image is 960 by 540 pixels.

It is important to note that this type of known decoder essentially loses video-related information before and after the IDCT process. One result of losing video-related information is that the symmetry of the resulting decoded image can be adversely affected. The loss of symmetry in the resulting decoded image from this type of known decoder can result in a lower quality image, for example, a non-symmetrical 4:2:0 lower-resolution image.

Figure 1:
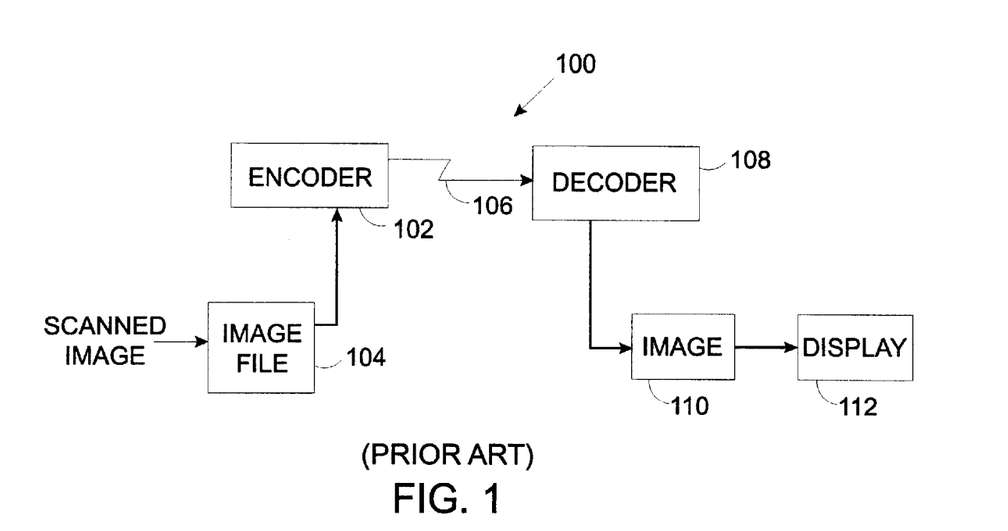
FIG. 1 is a block diagram depicting a conventional digital video encoding/decoding/transmission system.
Figure 2:
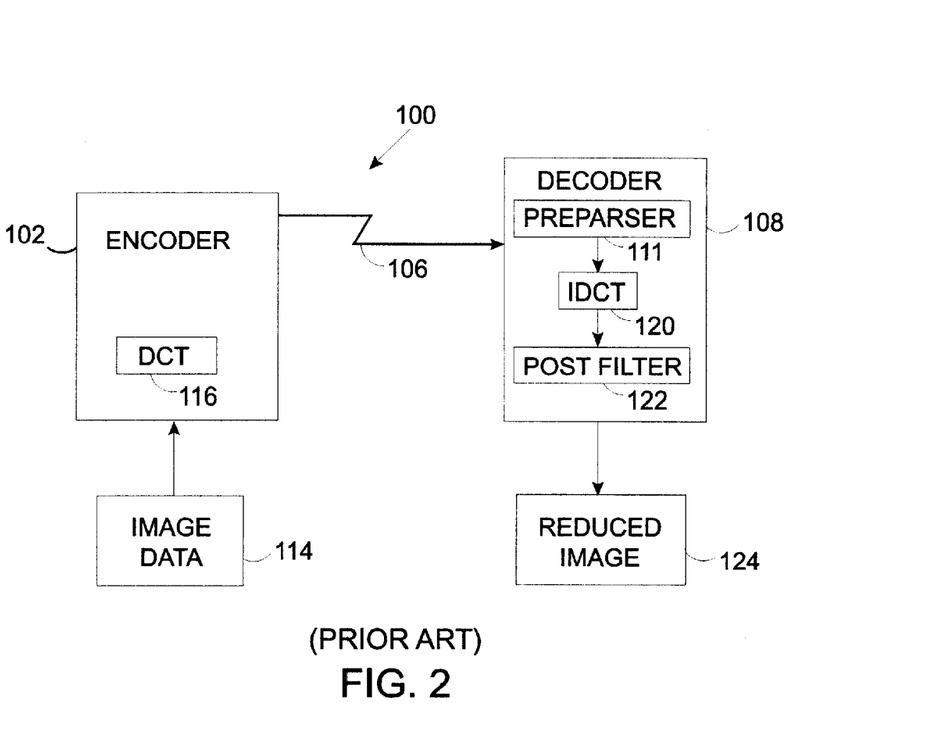
FIG. 2 is a block diagram depicting a conventional digital video encoding/decoding/transmission system that reduces a higher definition image to a lower definition image that can be displayed on a lower resolution display.

FIGS. 1 and 2 show block diagram depictions of conventional digital video encoding/decoding transmission systems. FIG. 1 is a block diagram depicting a conventional system 100 having an encoder 102 that encodes an image file 104 containing image data 114. The output of encoder 102, i.e., encoded image data, is transmitted or otherwise provided to a decoder 108 through a transmission link 106.

Transmission link 106 can include one or more communication media and/or systems and supporting apparatii that are configured to carry the encoded image data from encoder 102 to decoder 108. Examples of transmission link 106 may include, but are not limited to, a telephone system, a cable television system, a direct or an indirect broadcast television system, a direct or an indirect satellite broadcast system, one or more computer networks and/or buses, the Internet, an intranet, and any software, hardware and other communication systems and equipment associated therewith.

Decoder 108 decodes the received encoded image data and outputs an image 110 that is suitable for reproduction through a display 112. In certain conventional systems, encoder 102 and/or decoder 108 may include one or more processors that each are coupled to a memory. The processor(s) respond to computer implemented instructions stored within the memories to encode or decode image data 114, as required. In other conventional systems, encoder 102 and/or decoder 108 include logic that is configured to encode or decode image data 114, as required.

FIG. 2 is a block diagram depicting a conventional encoding/decoding/transmission system 100 that reduces a higher definition image 114 to a lower definition image 124 that can be displayed on a lower resolution display (not shown). System 100 includes an encoder 102 which implements a DCT algorithm 116 that encodes image data 114 using a DCT algorithm. Decoder 108, in FIG. 2, then operates on the coded image signal using a pre-parser algorithm 118, an IDCT algorithm 120 and a post filter algorithm 122, and outputs a reduced image 124. Pre-parser algorithm 118 decimates, filters, masks, and/or otherwise reduces the amount of encoded image data from encoder 102, and outputs a subset of the received encoded image data to the IDCT algorithm 120 for further processing.

The IDCT algorithm 120 then decodes the subset of the encoded image data and outputs the decoded image data to a post filter algorithm 122. Post filter algorithm 122 further processes and configures the decoded image data to produce a reduced image 124.

Post filter algorithm 122 typically decimates, filters and/or otherwise down-samples the decoded data. Reduced image 124 represents a lower definition image that is suitable for display on a lower resolution display.

Figure 5:
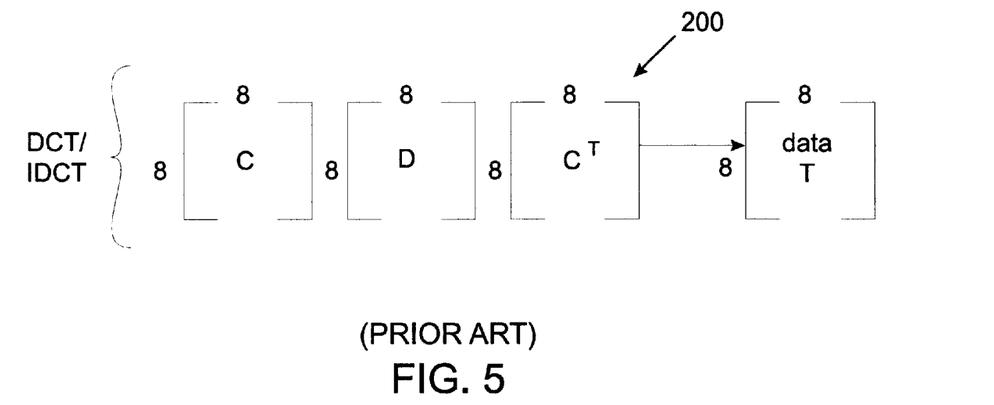
FIG. 5 depicts conventional matrix operations associated with a DCT/IDCT process as shown in FIG. 2.

FIG. 5 depicts conventional matrix operations 200 associated with a DCT/IDCT algorithms. Matrix D is an 8 by 8 matrix (e.g., a macroblock) of image data that is multiplied by the 8 by 8 DCT/IDCT coefficient matrixes C to $C^T$ to produce an 8 by 8 data matrix T.

The data matrix T in FIG. 5 is eventually provided to the decoder 108 through link 106. Table 1 shows a conventional computer program that includes an IDCT process having an inverse fast discrete cosine transform. As illustrated in Table 1, a section 300 has been included to point out the mathematical steps that implement the inverse fast discrete cosine transform. The algorithms contained within the computer program in Table 1, and in particular the coefficients applied in matrix operations 200, are based on the DCT and IDCT which are defined, for example, within referenced sections 304, 308 and 310 in Table 3. However, reduced image 125 has undergone substantial, time consuming and inefficient processing to produce a low quality image.

OBJECTS OF THE INVENTION

It is therefore an object of the present invention to provide a system and method for providing a low definition digital video signal from a high definition digital video signal.

It is another object of the present invention to provide a system and method for quickly and efficiently converting a high definition digital video signal into a low definition digital video signal format for display.

SUMMARY OF THE INVENTION

These and other objects of the present invention are achieved by incorporating wavelet transforms within the methods and arrangements of the present invention to produce coefficients that are part of discrete wavelet transforms (DWT) and/or inverse discrete wavelet transforms (IDWT).

For example, in accordance with a first preferred embodiment of the present invention, an IDWT process is advantageously included within a decoder to decode and decimate encoded higher definition image data to produce lower definition image data that is suitable for display on a lower resolution display apparatus.

In accordance with one preferred embodiment of the present invention, the decoding and decimation of the DCT encoded image data has been consolidated within the decoding process, and made easier by a decoder having an IDWT process that accomplishes both decoding and decimation. The image data that is decoded by an IDWT configured decoder can be displayed on a lower resolution display as a 4:2:0 video image.

This IDWT decoded 4:2:0 video image is symmetrical because the received encoded image data is not pre-parsed or otherwise filtered prior to being decoded by the IDWT process. Instead, all of the received encoded image data is processed using the IDWT. The IDWT process, as applied to the received encoded image data, inherently decimates or down-samples the amount of video data. The IDWT takes advantage of the reducing capability of one or more wavelet transforms as applied to discrete blocks of received encoded video data through the coefficients of the IDWT.

An additional benefit of the IDWT configured decoder is that, in the case of video, such as MPEG-2 images, motion compensation is accomplished on the decimated output of the IDWT process.

The known decoders typically perform motion compensation on 16 by 16 blocks or matrixes of image data. An IDWT configured decoder, in accordance with the first preferred embodiment of the present invention, will reduce the blocks or matrixes of image data to ¼ the original size, that is 8 by 8. These 8 by 8 blocks of image data are then momentarily interpolated to the original size and the same motion vectors as would normally be used in the 16 by 16 blocks are applied, however with a reduced number of operations and increased speed. The reduced size of the image data also reduces the memory requirements of the decoder, such as, for example, a cache memory that supports one or more processors that are included in the decoder.

Thus, the present invention provides methods and arrangements that allow a consumer to receive high definition image data and convert the data for display on existing television sets, or on less expensive high resolution displays. The methods and arrangements of the present invention can also be used by the producers and/or broadcasters of the signals to produce fairly high-definition image data.

BRIEF DESCRIPTION OF THE DRAWINGS

The above and other features, organizations, advantages and objects of the present invention, which are believed to be novel, are set forth with particularity in the appended claims. The present invention, both as to its organization and manner of operation, together with further objects and advantages, will be fully understood from the following detailed description and the accompanying drawings. Each of the drawings contained herein are not considered to be accurate depictions of the embodiments of the invention, but are provided for illustrative purposes only and are to be interpreted in conjunction with the attached specification.

FIG. 4b is a block diagram depiction of the system for combining the wavelet reduced image and the IDCT image in accordance with a second preferred embodiment of the present invention as shown in FIG. 4a.

DETAILED DESCRIPTION OF THE PREFERRED EMBODIMENTS

The following description is provided to enable any person skilled in the art to make and use the invention and sets forth the best modes presently contemplated by the inventors of carrying out the invention. Various modifications, however, will remain readily apparent to those skilled in the art, since the generic principles of the present invention have been defined herein.

Figure 3:
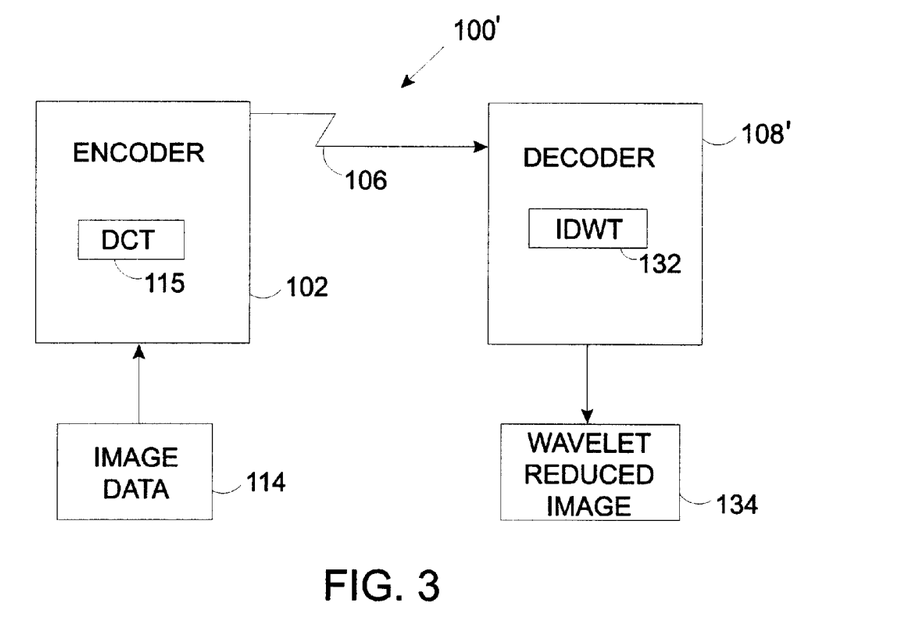
FIG. 3 is a block diagram depicting an improved system in accordance with a first preferred embodiment of the present invention which reduces a high definition digital image to a low definition image that can be displayed on a low resolution display.

FIG. 3 is a block diagram depicting an improved system 100' in accordance with a first preferred embodiment of the present invention which reduces a high definition digital image to a low definition image that can be displayed on a lower resolution display. As shown in FIG. 3, system 100' of the first preferred embodiment of the invention includes a conventional encoder 102 which applies a DCT algorithm 116 to the image data 114, and transmits the encoded signal over transmission link 106, as described above.

A decoder 108' constructed according to a first preferred embodiment of the present invention is coupled to link 106 and configured to receive encoded image data from encoder 102. Decoder 108' applies an IDWT algorithm 132 that is configured to decode and decimate the encoded image data, and output a wavelet reduced image 134. The output from the IDWT process is a wavelet reduced image 134 which represents an improvement over the reduced image 124 produced by the conventional decoder 108 depicted in FIG. 2. The wavelet reduced image 134 is both symmetrical and motion compensated. Additionally, the IDWT algorithm 132 tends to speed up the processing within decoder 108' of the first preferred embodiment of the present invention.

Figure 4A:
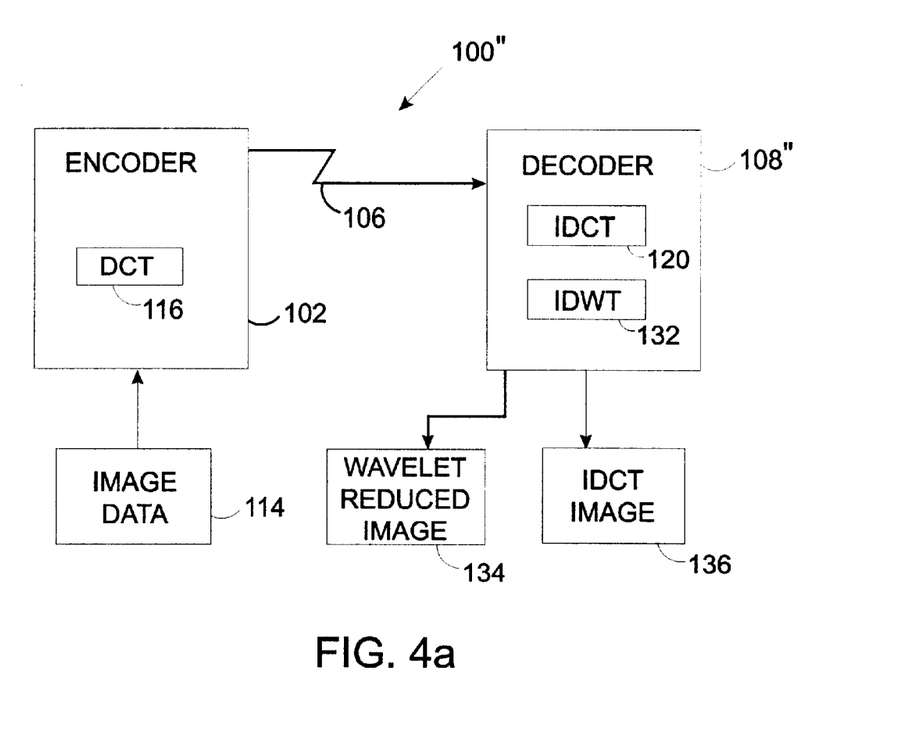
FIG. 4a is a block diagram depiction of an improved system in accordance with a second preferred embodiment of the present invention which reduces a high definition image to one or more low definition images that can be displayed on different, low resolution displays.

FIG. 4a is a block diagram of an improved system 100" in accordance with a second preferred embodiment of the present invention. The system 100" of the second preferred embodiment of the present invention reduces a high definition image to one or more low definition images that can be displayed on different low resolution displays.

System 100" of the second preferred embodiment of the present invention includes a conventional encoder 102 which applies a DCT algorithm 116 to encode the image data 114 and transmit the encoded data over transmission link 106, as described above.

A decoder 108" constructed in accordance with the second preferred embodiment of the present invention is coupled to transmission link 106 and configured to receive encoded data from encoder 102. Decoder 108" is a hybrid of conventional decoder 108 depicted in FIG. 2 and decoder 108' of the first preferred embodiment of the present invention depicted in FIG. 3. As shown, decoder 108" applies an IDCT algorithm 120 and an IDWT algorithm 132, each of which is configured to separately decode the encoded image data.

IDCT algorithm 120 outputs an IDCT image 136 that represents the high definition image 114 as encoded by DCT algorithm 116 within encoder 102. IDWT algorithm 132 not only decodes the received encoded data, but also decimates the encoded image data (as described above) to produce a wavelet reduced image 134.

Figure 4B:
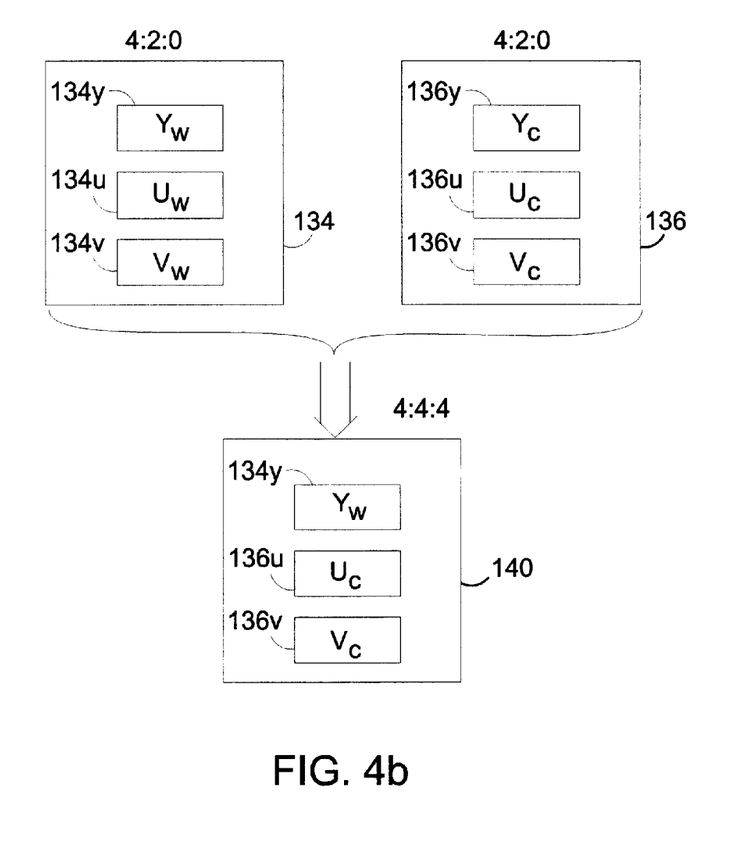

Representations of the wavelet reduced image 134 and the IDCT image 136 of the second preferred embodiment of the present invention are depicted in the block diagram of FIG. 4b. Wavelet reduced image 134 includes $Y_w$ data 134Y, $U_w$ data 134U and $V_w$ data 134V. Wavelet reduced image 134, in accordance with one embodiment of the present invention, provides a 4:2:0 video image. IDCT image 136 includes $Y_C$ data 136Y, $U_C$ data 136U and $V_C$ data 136V. IDCT image 136, in accordance with the second preferred embodiment of the present invention, also provides a 4:2:0 video image.

As depicted, a hybrid image 140 may be produced, in accordance with the second preferred embodiment of the present invention, by combining $Y_W$ data 134Y with $U_C$ data 36U and with $V_C$ data 136V. In the second preferred embodiment, hybrid image 140 may, in certain embodiments, result in a 4:4:4 video image.

Figure 8:
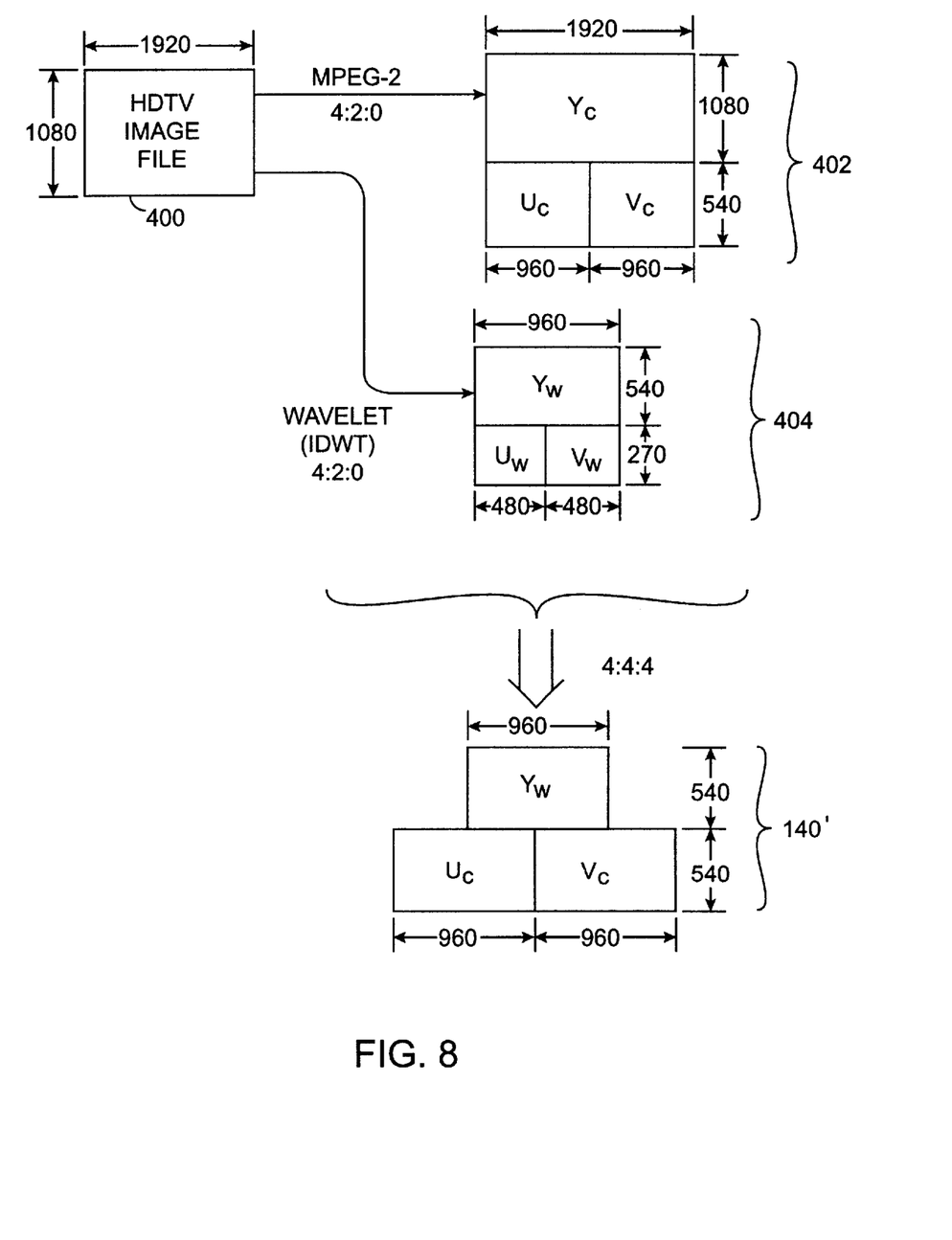
FIG. 8 is an illustration of an HDTV image file converted using a DCT encoding and/or an IDCT decoding process to produce an image in accordance with the operations of FIG. 4b.

For example, referring to FIG. 8, an HDTV image file 400 having 1920 by 1080 pixels is converted in accordance with MPEG-2 standards (e.g., using a DCT encoding and/or an IDCT decoding process) to produce an IDCT image 402 wherein, for each frame, there is 1920 by 1080 pixels of $Y_C$ data, 960 by 540 pixels of $V_C$ data and 960 by 540 pixels of $U_C$ data. The same HDTV image file 400 is converted, in accordance with the second preferred embodiment of the present invention (e.g., using a DCT encoding and/or an IDWT decoding process), to produce a wavelet reduced image 404 wherein, for each frame, there is 960 by 540 pixels of $Y_W$ data, and 480 by 270 pixels of $U_W$ data and 480 by 270 pixels of $V_W$ data. As shown, a hybrid image 140' can be created by combining the 960 by 540 pixels of $Y_W$, and the 960 by 540 pixels of $U_C$ and $V_C$ data. The resulting combined 4:4:4 video image will have a higher definition than the 4:2:0 video image of wavelet reduced image 404.

Figure 6A:
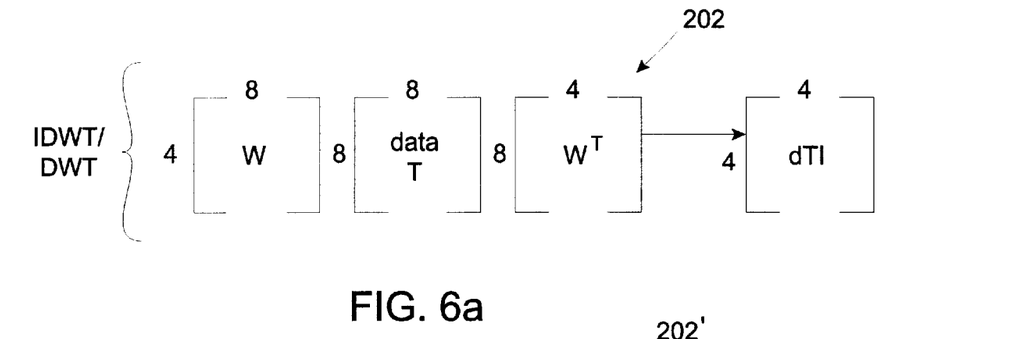
FIG. 6a depicts demonstrative matrix operations which are associated with exemplary IDWT/DWT algorithms used by the preferred embodiments of the present invention.
Figure 6B:
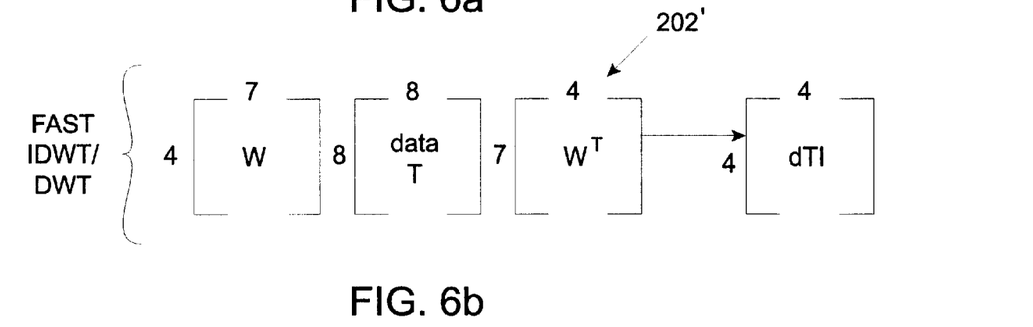
FIG. 6b depicts demonstrative matrix operations which are associated with exemplary fast IDWT/DWT algorithms used by the preferred embodiments of the present invention.

FIGS. 6a and 6b depict demonstrative matrix operations 202 and 202', respectively, which are associated with exemplary IDWT processes used by the preferred embodiments of the present invention. In operation 202, the information which makes up data matrix T is received from encoder 102 via link 106, and is multiplied by a 4 by 8 IDWT coefficient matrix W and an 8 by 4 IDWT coefficient matrix $W^T$ to produce a 4 by 4 matrix dTI.

In an another embodiment of the present invention, namely operation 202', data matrix T may be received from encoder 102 via link 106, and multiplied by a 4 by 7 fast IDWT coefficient matrix W and a 7 by 4 fast IDWT coefficient matrix $W^T$ to produce a 4 by 4 matrix dTI.

Table 2 shows an exemplary computer program that includes a IDWT process which may be used by the preferred embodiments of the present invention. As shown in Table 2, a section 302 has been included to point out the mathematical steps that implement the IDWT process. The algorithms contained within the computer program in Table 2, and in particular the coefficients applied in matrix operations 200, are based on the DWT function which is defined in reference block 306 in Table 3, and in the related derivations within referenced sections 312 and 314, also in Table 3.

A fast DWT/IDWT matrix operation is created by further reducing the number of mathematical operations required, for example, by eliminating the operations relating to the row of coefficients that equal zero (=0) in matrix W as derived in section 312 of Table 3. The fast DWT/IDWT matrix operations can further be optimized by identifying rows, columns, and/or elements that have something in common. For example, in the first or top row of the derived matrix in section 312, all of the elements have the same value (at this resolution), and/or in the third row down from the top, the elements have the same absolute magnitude however some are positive and some are negative. Those skilled in the art will recognize these and other reductions that will save computational time and/or reduce the number of required operations.

In accordance with a third preferred embodiment of the present invention, the DWT is used to encode image data for transmission. For example, in system 300 shown in the block diagram of FIG. 7, the DWT functions, algorithms, and derivations/coefficients presented in Tables 2 and 3 are included in a DWT process 302 within an encoder 102' to encode image data 114.

Figure 7:
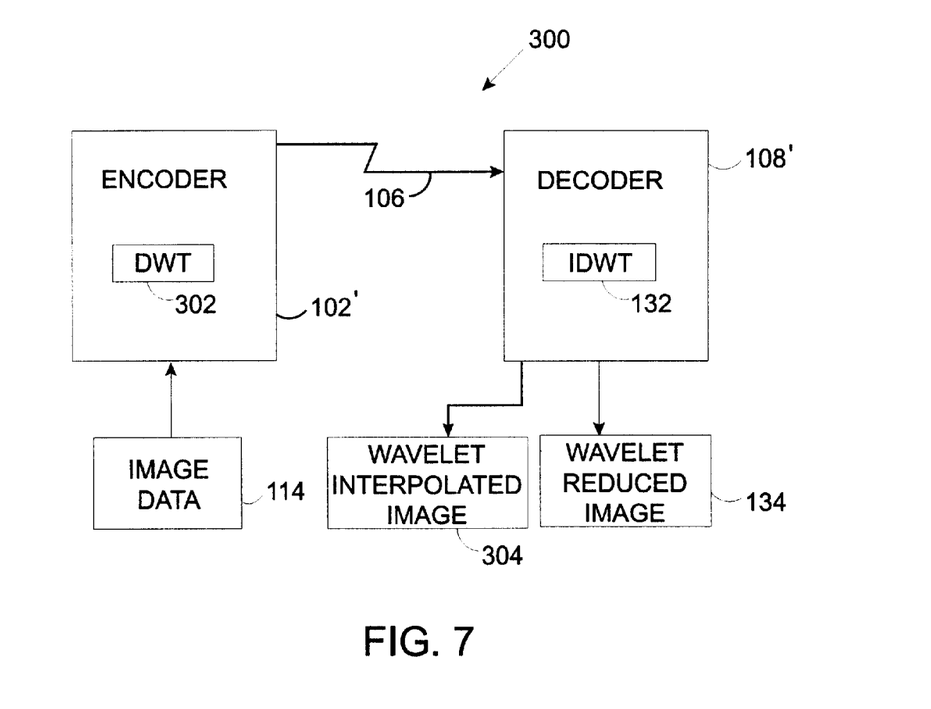
FIG. 7 is a block diagram depiction of an improved system in accordance with a third preferred embodiment of the present invention where the DWT is used to encode image data for transmission.

Following transmission over channel 106, the encoded image data can then be provided to one or more decoders, such as decoder 108', to produce a lower definition wavelet reduced image 134, and/or higher definition wavelet interpolated image 304. In this third embodiment of the present invention, instead of encoding with a DCT process, the DWT process is used for both encoding and decoding. Switching to a wavelet based transform and optimizing the matrix operations tends to reduce the number of operations required and the communication and/or memory requirements within the overall system. The result is that several different (high or low) definition images can be produced for different display resolutions.

In accordance with certain aspects of the present invention, different wavelet transforms can be used within specific systems and/or for certain types of images in the methods and arrangements of the present invention.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A high definition video decoder comprising:
   a. means for receiving a transmitted HDTV signal;
   b. decoding means for decoding the received HDTV signal, the decoding means applying an IDWT algorithm to the transmitted HDTV signal to provide a wavelet reduced image; and
   c. output means for outputting the wavelet reduced image.

2. The high definition video decoder of claim 1, further comprising a second decoding means for decoding the received HDTV signal, the second decoding means applying an IDCT algorithm to the transmitted HDTV signal to provide an IDCT image.

3. The high definition video decoder of claim 2, further comprising a means for combining the wavelet reduced image with the IDCT image.

4. A high definition video transmission system comprising:
   a. means for transmitting an HDTV signal representative of image data;
   b. coding means within the transmitting means, the coding means applying a DWT algorithm to the image data to provide the HDTV signal;
   c. means for receiving a transmitted HDTV signal;
   d. decoding means for decoding the received HDTV signal, the decoding means applying an IDWT algorithm to the transmitted HDTV signal to provide a wavelet reduced image; and
   e. output means for outputting the wavelet reduced image.

5. The high definition video decoder of claim 4, further comprising a decoding means for decoding the received HDTV signal, the second decoding means providing a wavelet interpolated image.

6. A high definition video transmission system comprising:
   a. means for transmitting an HDTV signal representative of image data;
   b. coding means within the transmitting means, the coding means applying a coding algorithm to the image data to provide the HDTV signal;
   c. means for receiving a transmitted HDTV signal;
   d. decoding means for decoding the received HDTV signal, the decoding means applying a decoding algorithm to the transmitted HDTV signal to provide an output image;
   e. output means for outputting the output image; and
   f. wherein the algorithms applied to the signal include wavelet transforms.

7. A high definition video transmission system comprising:
   a. means for transmitting an HDTV signal representative of image data;
   b. coding means within the transmitting means, the coding means applying a DWT algorithm to the image data to provide the HDTV signal;
   c. means for receiving a transmitted HDTV signal;
   d. decoding means for decoding the received HDTV signal, the decoding means applying an IDWT algorithm to the transmitted HDTV signal to provide a wavelet reduced image; and e. output means for outputting the wavelet reduced image.

8. The high definition video decoder of claim 4, further comprising a decoding means for decoding the received HDTV signal, the second decoding means providing a wavelet interpolated image.

9. A high definition video transmission system comprising:

a. applying a coding algorithm to image data to provide an HDTV signal;

b. transmitting the HDTV signal representative of the image data;

c. receiving the transmitted HDTV signal;

d. applying a decoding algorithm to the received HDTV signal;

e. providing an output image; and f. wherein the algorithms applied to the signals include wavelet transforms.

10. A method for decoding high definition video signals comprising the steps of:

a. receiving a transmitted HDTV signal;

b. decoding the received HDTV signal by applying an IDWT algorithm to the transmitted HDTV signal;

c. providing a wavelet reduced image; and d. outputting the wavelet reduced image.

11. The method of claim 10, further comprising the steps of:

a. alternatively decoding the received HDTV signal by applying an IDCT algorithm to the transmitted HDTV signal;

b. providing an IDCT image.

12. The method of claim 11, further comprising the step of combining the wavelet reduced image with the IDCT image.

* * * * *